UNITED STATES PATENT OFFICE.

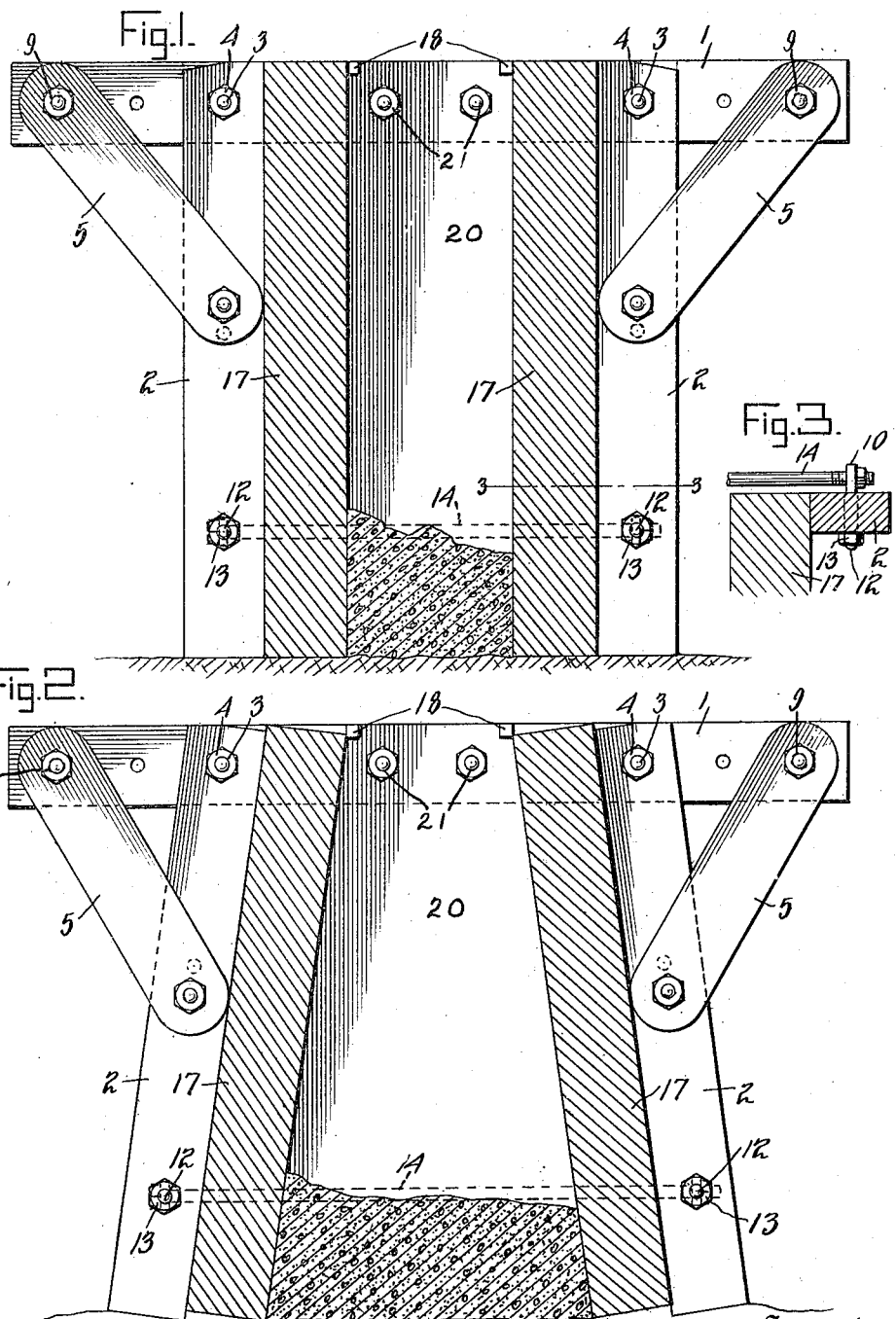

ROBERT HENRY WARNER, OF PLYMOUTH, MICHIGAN.

CURB-TEMPLET.

1,245,840.  Specification of Letters Patent.  Patented Nov. 6, 1917.

Application filed May 5, 1917. Serial No. 166,651.

*To all whom it may concern:*

Be it known that I, ROBERT H. WARNER, a citizen of the United States, residing at Plymouth, in the county of Wayne and State of Michigan, have invented certain new and useful Improvements in Curb-Templets; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in molding devices and particularly to that type of molds known as curb templets.

The object of this invention is the provision of a curb templet having means to permit the same to be used with a curb plate for producing an angular curb, or a vertical wall curb.

The invention comprises various details of construction, combinations and arrangements of parts which will be hereinafter fully described, shown in the accompanying drawings and then specifically defined in the appended claim.

My invention is illustrated in the accompanying drawings, in which:—

Figure 1 is a side section of the device forming the present invention.

Fig. 2 is a side section of the device adjusted to support a curb plate at an angle.

Fig. 3 is a section on line 3—3 of Fig. 1.

Reference now being had to the details of the drawings by numeral, 1 indicates an upper horizontal support, constructed of wood or metal, to which are pivotally connected the side bars 2, by means of bolts 3 extending through the upper ends of said side bars and adapted to be held against movement by means of nuts 4 which bind against the bars 2 when the same are tightened or screwed home. Brace bars 5 have their upper ends pivoted to the upper horizontal support 1 by means of the bolts and upon which nuts 9 are fitted, the lower ends of the brace bars 5 being pivotally connected to the respective side bars 2 by bolts passing through the side bars 2. The upper ends of the brace bars 5 may be positioned in either of the openings of the support 1, thereby providing for an adjustment of the side bars 2, to permit them to be employed for supporting said side bars at an angle to produce an angular curb, if desired, as shown in Fig. 2.

In order that this device may be used in the construction of large work, I have provided connecting pieces, each of which comprises the apertured head 10 and threaded shank 12, over which engages the nut 13 to secure the connecting piece to the side bars 2. It is, of course, obvious that these connecting pieces are only employed to support the side bars 2 in an upright position and, in order to accomplish this result, the rods 14 are provided, and which are fastened to the rods in the manner shown in Fig. 3 of the drawings.

Pieces 20 of any suitable material are held to the bars, one through the medium of the bolts 21 and serve as ends to the molds for the curbs.

In assembling the various elements of this invention for operation, the side bars 2 are moved to their proper angle by adjusting the brace rods 5. The screw 10 is adjusted in the apertures in the bars 2 and the nuts 13 are fitted to the threaded end of the screw. The threaded rods 14 are passed through the eyes of the screws and nuts screwed on to the threaded portion of said rods and which rods will serve to hold the bars 2 in properly adjusted positions. The curb plates 17 are then positioned intermediate the bars, said curb plates engaging the lugs 18 which project from the bars and serve to hold corresponding ends in position to receive and form the curb.

What I claim to be new is:—

A curb molding device comprising supports having lugs projecting laterally therefrom, bars adjustably connected to said supports, curb plates positioned intermediate said lugs and bars, adjustable braces pivotally connecting said supports and bars, screw eyes carried by said bars and rods passing through said eyes and having threaded portions, nuts upon the ends of the rods.

In testimony whereof I hereunto affix my signature in presence of two witnesses.

ROBERT HENRY WARNER.

Witnesses:
M. E. WISELEY,
C. A. FISHER.

Copies of this patent may be obtained for five cents each, by addressing the "Commissioner of Patents, Washington, D. C."